May 25, 1943.   B. H. ADLER   2,319,910
SIGN
Filed Dec. 9, 1939   6 Sheets-Sheet 1

Inventor:
Benjamin H. Adler

May 25, 1943.  B. H. ADLER  2,319,910
SIGN
Filed Dec. 9, 1939  6 Sheets-Sheet 2

Inventor:
Benjamin H. Adler

May 25, 1943.   B. H. ADLER   2,319,910
SIGN
Filed Dec. 9, 1939   6 Sheets-Sheet 5

Inventor:
Benjamin H. Adler

May 25, 1943.  B. H. ADLER  2,319,910
SIGN
Filed Dec. 9, 1939   6 Sheets-Sheet 6

Inventor:
Benjamin H. Adler

Patented May 25, 1943

2,319,910

UNITED STATES PATENT OFFICE 2,319,910

SIGN

Benjamin H. Adler, Chicago, Ill.

Application December 9, 1939, Serial No. 308,413

14 Claims. (Cl. 40—140)

The present invention relates to changeable signs. It is particularly directed to that type of display sign wherein a plurality of panels are arranged in line to provide a large display area upon which letters, figures or designs are mounted and displayed. The panels usually are composed of frames and sheets of suitable material associated with the frames. The sheet material used may be of an opaque or translucent type. Where translucent material is used, it is generally for the purpose of providing illumination of the display area from a source behind the panels. Such signs are referred to as "silhouette" type because the letters or figures that are mounted in the illuminated area appear in silhouette in front of the panels.

It is the principal purpose of this invention to provide a sign construction wherein certain plastic materials such as those now commercially available in sheet form may serve as the display area of the sign and may also support the letter or design. The panels are so prepared and constructed that they may be placed in a regular sign box and removed therefrom individually. In the preferred form of the invention the several panels are each made up of a plurality of sections, the sections being bound together along their side edges and each section being adapted to carry a portion of the load of the letter or design. The several sections of the panels may, in certain constructions, be removably mounted in a framework which is itself insertable in the sign box. The sections are so arranged in the respective panels that the letter supporting portions thereof may be aligned lengthwise of the display area in order that letters or designs supported thereon can be moved from one panel to an adjacent panel with no difficulty.

It is preferable, in constructing the display panels, to so construct the letter and design carrying portions thereof as to avoid the emission of light through any cracks between the sections of translucent material employed. To this end, the letter supporting means is so arranged that the joint between sections, where sections are used, is overlapped by the letter supporting means.

The present invention contemplates also a sign construction wherein the several panels are so arranged that they may be mounted on projecting edges around the display opening in the sign box by means of channels provided on the framework of each panel.

It is a further purpose of the invention to provide a novel letter construction whereby rearwardly extending projections are provided on the letters to extend beyond the planes of the rear edges thereof. This construction is particularly advantageous in the application of the letters to that type of construction where the separate sheets in the sign panels are spaced apart so that the letter mounting means goes between the sheets.

The invention further contemplates a novel letter construction wherein the front face of the letter is composed of a peripheral bevel and an intermediate surface which is visible from all angles. Desirably, this intermediate surface is concave so as to present a smooth surface that is easily painted or cleaned, in order to give a bright and clean-cut appearance under all conditions.

Other objects and advantages of the invention will appear more fully as the description proceeds in connection with the accompanying drawings. It is to be understood, however, that the drawings and description are illustrative only, and are not to be taken as limiting the invention except insofar as it is limited by the claims.

In the drawings,

Fig. 18 is a view in front elevation of a letter embodying the novel features hereinbefore referred to;

Fig. 19 is a sectional view on the line 19—19 of Fig. 18;

Referring now to the drawings, and particularly to Figs. 1–5 inclusive, the present invention is shown as applied to a sign box 1 which may have suitable illuminating devices such as lamps 2 mounted therein. It is customary in the art to which this invention applies to so mount and arrange the lamps 2 as to obtain a substantially even distribution of light throughout the interior of the sign box 1. The sign box 1 is usually constructed of sheet metal and is provided with an upper channel 3 and a lower channel 4 at the front thereof. These channels are adapted to receive one or more display panels 5. The display panels are adapted to support a plurality of letters, characters or designs 6 in order to convey a message of some sort. Some of the signs have the display panel of only sufficient height to take a single row of the letters 6. However, in the principal use to which this device is put, namely, theater and show place marquee installation, the display panels are of sufficient height to employ more than one row or line of letters. The letters 6 are customarily made in several sizes, and the display panels carry letter supporting means 7 so arranged thereon as to enable the user of the sign to arrange the several letters or characters to display the desired message.

Figures 1, 2, 3, 4, 5:
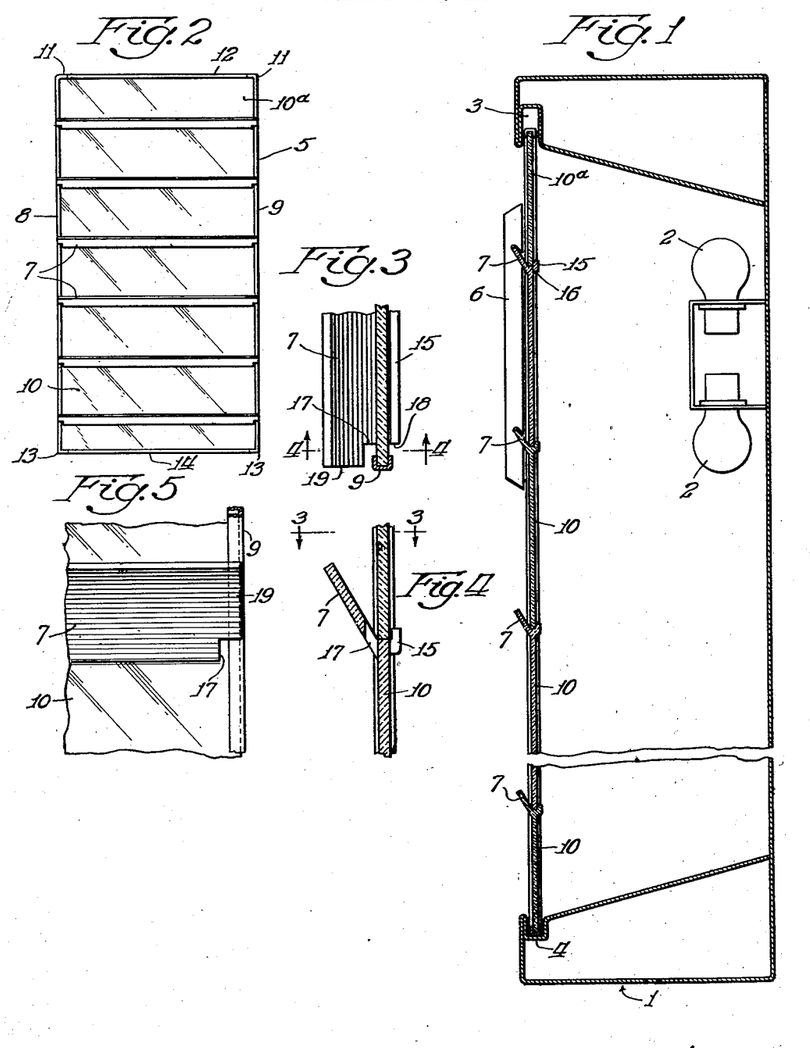
Fig. 1 is a vertical sectional view through a sign box illustrating a preferred form of display panel.
Fig. 2 is a front view of one of the panels employed in Fig. 1.
Fig. 3 is an enlarged plan sectional view through a side edge of the panel shown in Fig. 2.
Fig. 4 is a sectional view taken substantially on the line 4—4 of Fig. 3.
Fig. 5 is a fragmentary view in front elevation of a portion of the panel.

The display panel shown in Fig. 2 comprises upright channel members 8 and 9 and a multiplicity of separate sheets 10 mounted one upon the other between the channel members 8 and 9. The channel members 8 and 9 have their upper ends 11 joined by a cross channel 12 and their lower ends 13 joined by a cross channel 14 to hold the several sheets 10 together. As shown best in Figs. 1 and 3, each of the sheets 10 has a flange projecting upwardly and outwardly at its upper edge. These flanges comprise the letter supporting means 7. Another flange 15 is provided opposite the flange 7 so as to leave a recess 16 along the upper edges of the sheets 10. These recesses 16 receive the lower edges of the superposed sheets. It will be noted that the top sheet 10a of each panel is simply a plain sheet devoid of flanges 7 and 15.

In the installation of the several panels 5, it is desirable that they be placed snugly against each other, and that the flanges 7 of one panel be aligned directly with the flanges 7 of the next adjacent panel so that the letters 6 can be shifted endwise from panel to panel. In order to accomplish this result and at the same time bind the edges of the panels with the upright channels 8 and 9, the flanges 7 and 15 are cut away as shown at 17 and 18 in Figs. 3 and 4, a projecting portion 19 being left on the flange 7. The cutting away of the flanges 7 at 17 is also advantageous in providing for ready drainage of any rain that may fall on the upper surface of the flange 7.

It will be noted that in the constructions thus far described the supporting means for the letters and characters is always found directly upon the sheets which make up the panels; that is, there is no separate framework or supporting rod mounted independently of the sheets which make up the display surface. This is one advantage that arises from the employment of plastic materials, as contrasted to the ordinary sheet of glass. The plastic materials have sufficient tensile strength to withstand the load. Since the letter mounting means does not need to be made strong enough to act as a structural support for the sheets, it can be made much lighter and therefore less noticeable to the eye. As the flanges 7 are of the same material as the sheets themselves, they, of course, do not interfere seriously with the smooth, unbroken appearance that is so desirable on the face of the sign.

Referring now to Figs. 6–14, inclusive, a modified form of the invention is shown in these figures. While the modified form of the invention utilizes plastic sheets as the display background, it is equally applicable to the utilization of glass sheets because, in the preferred form of this modification, each sheet is carried in a separate frame entirely independent of the other sheets and insertable and removable individually from the sign construction.

Figure 6:
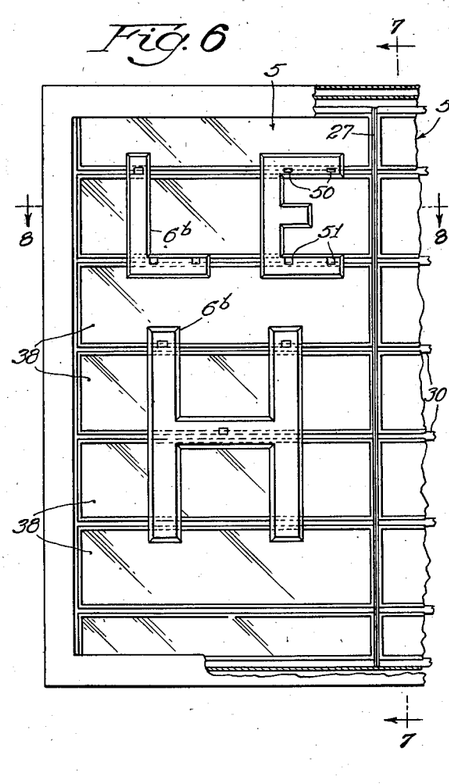
Fig. 6 is a fragmentary front view of a portion of a sign box illustrating a modified form of panel.
Figure 7:
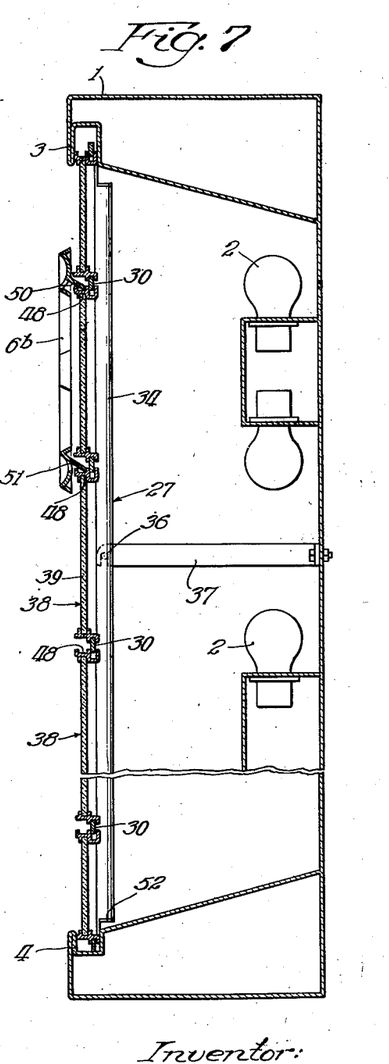
Fig. 7 is a sectional view taken on the line 7—7 of Fig. 6.
Figure 8:
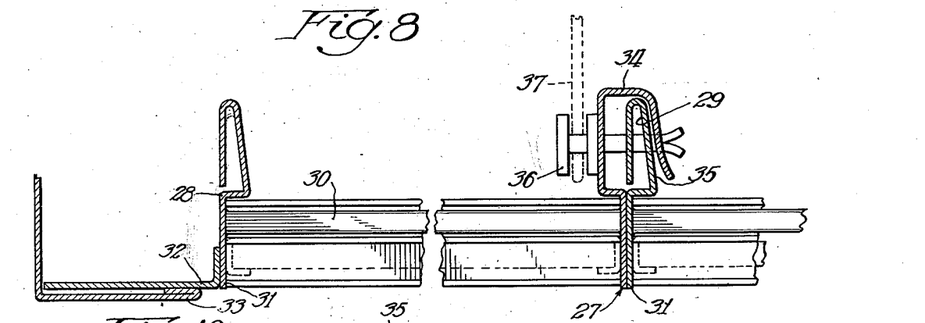
Fig. 8 is a plan sectional view taken on the line 8—8 of Fig. 6.
Figure 9:
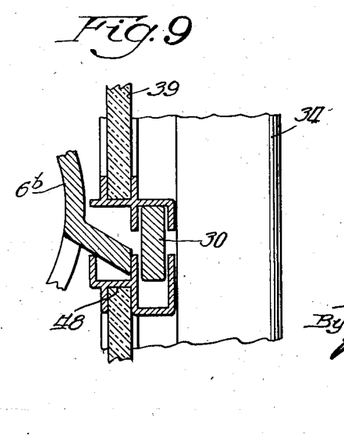
Fig. 9 is an enlarged fragmentary sectional view taken on the same line as Fig. 7.

Referring now particularly to Figs. 6, 7 and 8, the sign box 1 has its channels 3 and 4 somewhat wider than is necessary for the box used in connection with the panels of Fig. 1. The panels are carried in panel supporting frames 27. These panel supporting frames comprise a left-hand upright 28 and a right-hand upright 29. These uprights are connected by a plurality of cross bars 30 and each upright has a forwardly extending portion 31 thereon. The cross bars 30 are welded directly to the flanges 31. The end frames 27 are provided with strips 32 which are welded to the portions 31. The strip 32 is adapted to extend beyond the adjacent edge 33 of the sign box so as to block any light passage at this point. The strips 32 extend the full height of the frames 27.

Figures 10, 11, 12, 13:
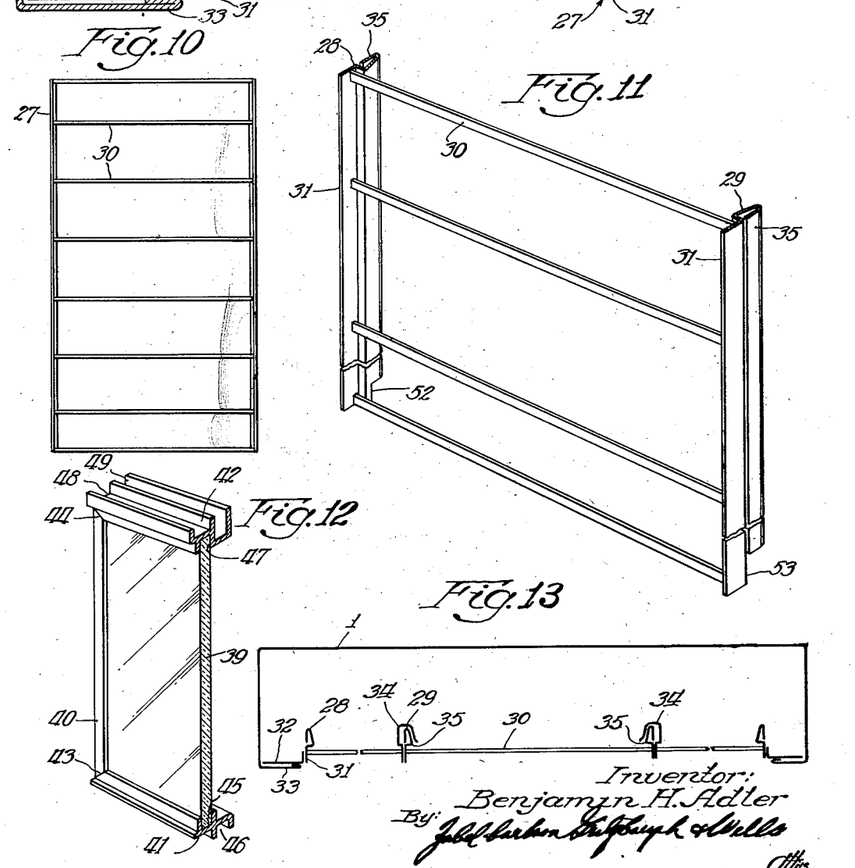
Fig. 10 is a view in front elevation of the panel supporting frame utilized in the form of the invention shown in Figs. 6 and 7.
Fig. 11 is a fragmentary perspective view of the panel supporting frame.
Fig. 12 is a fragmentary perspective view illustrating the construction of an individual panel.
Fig. 13 is a somewhat diagrammatic plan view illustrating the positioning of the several panel frames in a sign box.

In the arrangement of the several frames 27 within a sign box, as shown, the alternate frames can be removed. This is accomplished, as shown in Fig. 13, by making the frames with telescoping portions 34 and 35. The frame, as shown in Fig. 11, has both side edges provided with portions 35 which will nest within the portions 34 in the manner shown in Fig. 8. The portions 34 and 35 are constructed like those shown in my prior co-pending application Serial No. 263,704, filed March 23, 1939, for Signs, which has matured into Patent No. 2,284,626. The portions 34 and 35 are interlocked by suitable pins 36 which are also used to support tie bars 37 which extend to the back of the sign box 1. The cross bars 30 act to support a plurality of removable sections 38. Each removable section comprises a sheet 39 of plastic material or glass either in translucent or opaque form. The periphery of the sheet 39 is bound in a rectangular framework comprising vertical channel strips 40 and horizontal metal strips 41 and 42. The vertical strips 40 are of simple channel construction and are soldered to the horizontal channel strips 41 and 42 at 43 and 44 (see Fig. 12). The lower strip 41 has a channel 45 facing upwardly to receive the sheet 39. Rearwardly of the channel 45 the strip 41 has a downwardly facing channel 46 which is adapted to bear on one of the cross bars 30. The upper channel strip 42 has a downwardly facing channel 47 which receives the upper edge of the sheet 39. This strip has two upwardly facing channels 48 and 49. The channel 48 is directly over the channel 47 and may be slightly wider, as illustrated in Fig. 12.

The channel 49, however, is in vertical alignment with the channel 46, but is somewhat deeper. The channel 49 is adapted to receive the lower edge of a cross bar 30. The depth of the channel 49 is such that the entire section can be lifted up sufficiently to cause the channel 46 to clear the cross bar it is supported upon before the cross bar in channel 49 will reach the bottom of the channel. It is therefore possible to remove each of the sections 38 individually. The channels 48 are provided solely for the purpose of receiving projections on the letters or characters 6b. Each of the letters or characters 6b has vertically spaced projections 50 and 51 which are adapted to seat in the channels 48 of two vertically adjacent sections 38.

Figures 14, 15, 16, 17:
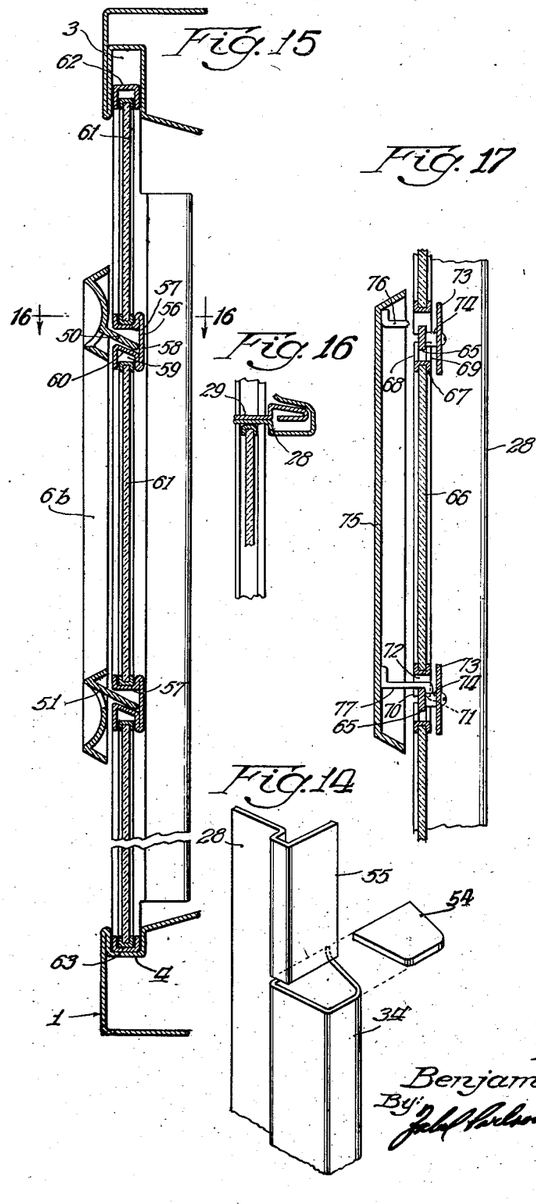
Fig. 14 is a fragmentary perspective view illustrating the upper end construction of the uprights used in the panel supporting frame shown in Figs. 10 and 11.
Fig. 15 is a sectional view taken vertically through a sign box illustrating a modified cross bar construction for the frame shown in Fig. 10.
Fig. 16 is a sectional view taken on the line 16—16 of Fig. 15.
Fig. 17 is an enlarged fragmentary sectional view illustrating a modified form of cross bar and sheet mounting.

It will be noted from Fig. 11 that the rearwardly extending portions of the uprights 28 and 29 are cut away, as indicated at 52 and 53. This is done in order that the frames may fit down into the lower channel of the sign box. At the upper ends of the uprights the rearwardly extending portions 34 and 35 are cut away. This construction is illustrated in Fig. 14 where one of the portions 34 is shown as cut away and capped by means of a cap 54. The cap 54 is soldered in place so as to prevent light from passing downwardly through the portion 34. Above the portion 34 the upright 28 is provided with a horizontally extending flange 55 which is adapted to overlap the cut away portion of the adjacent upright 29 and thus block the passage of light between them. This construction is quite similar to that shown in my co-pending application hereinbefore mentioned. It will be understood that where the upper and lower channels of the sign box are wide enough it is not necessary to cut away the rearwardly extending portions of the uprights. Also, the framework used with the removable sheets may be permanently affixed to the sign box or mounted in other ways than in channels. The removable sheets permit access to the interior of the box with the framework in place.

In Figs. 15 and 16 of the drawings, there is shown a slightly modified form of construction wherein the special frame around the sections 38 is not necessary. In this construction, the uprights 28 and 29 are connected by cross bars 75 56 which are shaped to receive the lugs 50 and 51 of the characters 6b. These cross bars, as shown, are made of thin metal shaped to provide an upper channel 57, a back piece 58 blocking the passage of light between vertically adjacent sections of glass or other translucent material, and a lower channel 59. The portion 60 of the bar which comprises the base of the lower channel 59 is sloped inward so as to provide an adequate support for the lugs 50 and 51. Removable sheets 61 of glass or plastic material are adapted to seat in the channels 57 and 59.

The channel 59 is deep enough to permit raising of the sheets 61 out of the channel 57 so that they may be removed from the sign.

The cross bar 62 at the top of the uprights 28 and 29 is of course only a simple inverted channel of sufficient depth to permit the top sheets 61 to be removed. The bottom cross bar 63 is a simple channel member. I have shown the several sheets 61 as having peripheral bindings 64 in the form of thin metal channels. This, however, is done merely to protect the sheets, and may be dispensed with wherever the sheets are constructed of a material that will not chip or crack easily.

In Fig. 17 there is a further modification which is quite similar to the modifications shown in Figs. 6–14 and Figs. 15 and 16 in that it provides for removably supporting the several sections which make up the display part of the panel. In this form of the invention the uprights 28 and 29 are connected by vertically spaced cross bars 65. These cross bars are plain, flat strips which are welded to the uprights 28 and 29 in the same manner as the cross bars 30. In fact, the construction of the frame for the modification in Fig. 17 may be identical with that shown in Figs. 10 and 11. A plurality of sections 66 of translucent material, such as glass or the plastic materials hereinbefore referred to, are adapted to be removably supported by the cross bars 65. Each of the sections 66 is bound in a peripheral channel 67. This channel has upstanding spaced lugs 68 and 69 at the top thereof and depending spaced lugs 70 and 71 at the bottom thereof. The lugs 68 and 69 are adapted to receive one of the cross bars 65. The lugs 70 and 71 are connected together, as indicated at 72, for a substantial distance below the sections 66 so as to make the projecting portions of the lugs 70 and 71 relatively short. They receive one of the cross bars 65 in the manner shown in Fig. 17.

It is preferable, in making the construction shown in Fig. 17, to have the uprights at the ends of the sections 66 extend beyond the sheet material and beyond the top and bottom channel portions. Then in order to form the projections 68 and 69 it is necessary to merely cut out the web portion of the channel to the desired depth. The projections 70 and 71 may be formed in the same manner. This provides a supporting portion 72 and two projections 70 and 71 at each bottom end of a section 66. Similarly, the projections 68 and 69 are found at each top end of a section 66. In order to block the passage of light between the bars 65 and sections 66, shields 73 are mounted on spaced posts 74 that are provided on the cross bars 65. These shields may be constructed of any suitable strip material, translucent or otherwise as desired. In mounting the letters or characters upon this type of construction, the cross bars 65 are utilized to support the characters. I have illustrated a bevelled letter 15 of the type shown in my prior patent hereinbefore mentioned with a pair of supporting lugs 76 and 77 hooked over the cross bars 65.

Figures 18, 19:
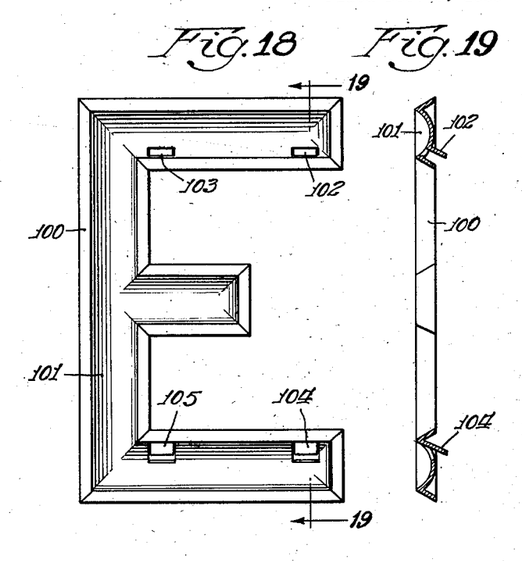
Figure 20:
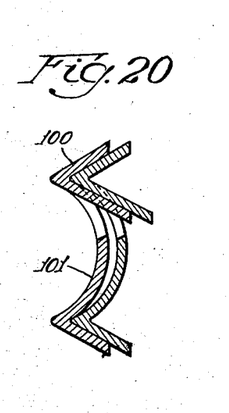
Fig. 20 is a fragmentary sectional view taken through a portion of the letter shown in Fig. 18 illustrating how letters of this character may be nested and stored for shipping.

Referring now to Figs. 18–20 inclusive, there is illustrated a form of letter or character which is particularly advantageous when used in connection with the disclosures in Figs. 1–5 inclusive and Figs. 6–13 inclusive. The letter construction comprises a body of sheet material, the periphery of which comprises a bevelled flange 100. The main body of the letter comprises a concave portion 101 which is concave to a depth equal to the depth of the flange 100. The supporting means for the letters is struck out from the concave portion 101 in such a fashion as to make no objectionable break in the visible surface of the letter. The supporting lugs 102 and 103 are struck out from the upwardly facing surface of the concave portion 101 along a horizontal portion of the character. In connection with such characters as shown in Fig. 18, it is possible to provide spaced lugs 102 and 103. However, in the case of a character such as the letter "O," if the lugs are placed at the top and the bottom of the letter is is probable that only one lug would be needed. The lower lugs 104 and 105 are shown as struck out from the concave face 101. The lugs 102, 103, 104 and 105 all extend at the same angle with respect to the plane of the letter. As shown in Fig. 20, these letters may be nested for storing and shipping, since the lug of one letter will overlap the lug of another letter of the same size, whether it be the lug 102 or the lug 104.

The particular construction of the letter just described has the advantage that it presents sharp, clean cut outlines which may be made to stand out boldly by using different colors on the flange portion 100 of the concave portion 101. One edge of the flange portion 100 will be brought into sharp contrast with the background on which it is displayed. Owing to the manner of providing the mounting, there need be no break whatsoever in the edge of the flange portion 100, the meeting line of the concave portion 101 and the flange portion 100 being a relatively sharp edge because the concave portion 101 can stand out boldly from the flange. The concavity of the portion 101 makes it particularly easy to paint and to keep clean after installation. Furthermore, the combination of the bevelled edge 100 and the concave portion 101 is particularly advantageous where the characters are made of a plastic material or material of low tensile strength. The construction avoids the necessity of any reinforcing ribs because the concave portion and the flange portion brace each other sufficiently.

Figure 21:
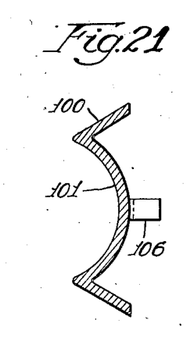
Fig. 21 is a sectional view taken through a letter of the same general type as that shown in Fig. 18 and illustrating a modified mounting lug construction.
Figure 22:
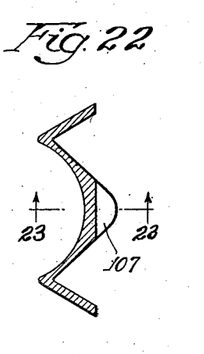
Fig. 22 is a view similar to Fig. 21, but illustrating a further modification of the mounting lug.
Figure 23:
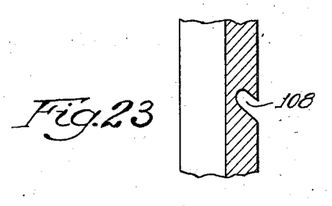
Fig. 23 is a sectional view taken on the line 23—23 of Fig. 22.

In Figs. 21 and 22 there are two modified forms of attaching means shown for the letter illustrated in Fig. 18. In Fig. 21 a simple lug 106 is provided at the base of the concave portion 101. In Fig. 22 the base of the concave portion is thickened at 107, and this thickened portion is provided with a notch 108 which slopes downwardly and is adapted to be hooked over a cross bar or similar mounting device of a sign.

Figure 24:
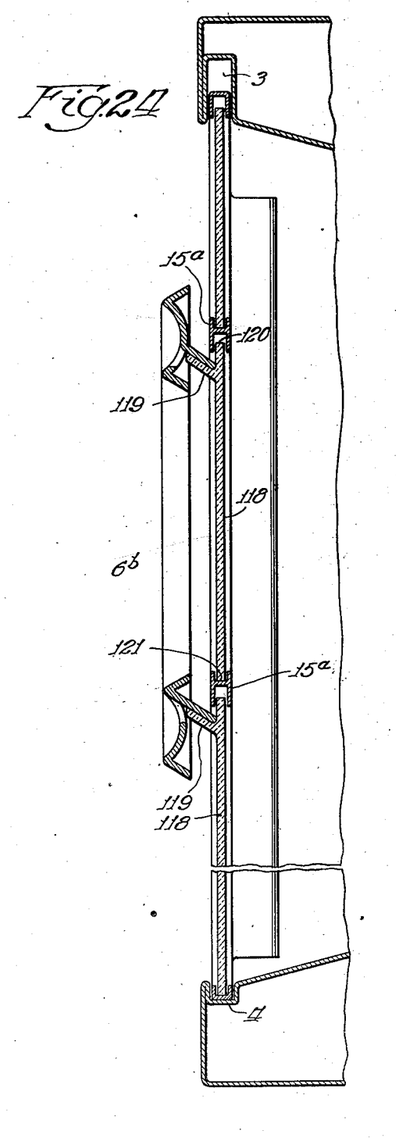
Fig. 24 is a fragmentary sectional view illustrating a form of device similar to that shown in Fig. 7, but with modifications in the removable panel and letter support.

In Fig. 24 there is shown a form of molded removable sheet construction that is particularly advantageous in the use of plastics. In this form, I utilize the framework of Figs. 7–11, but I use cross bars 15a of H-shaped cross section. Each sheet 118 has an upwardly and outwardly extending integral rib 119 which supports the letter. The upper edge 120 of each sheet is received in the lower channel of an H-shaped cross bar, while the lower edge 121 of that sheet is received in the upper channel of a subjacent cross bar. In cases where the height of opening in a sign box is not a multiple of the height of the sheets, a standard sheet may be trimmed at the bottom or top until it is of the proper height to fill in at the top of the framework above a number of standard sheets.

Figure 25:
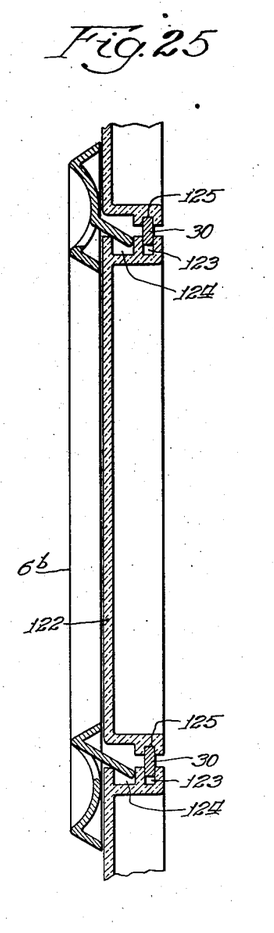
Fig. 25 is a view similar to Fig. 24 illustrating a further modification.

In Fig. 25 I show another form of molded plastic sheet or panel adapted to be mounted in the frame work shown in Figs. 7–11, inclusive. In this form, the panel 122 is pan shaped and has separated grooves 123 and 124 at its top. The groove 123 is adapted to engage a cross bar 30 of the framework. The groove 124 is adapted to support a letter such as the letter 6b. The lower edge of the panel 122 has a groove 125 adapted to receive the upper part of a subjacent cross bar 30.

The structures shown in Figs. 24 and 25 are, of course, applicable to the framework comprising uprights and cross bars, whether the framework be permanently or removably mounted on the sign box. The removable panel directly carries the letters without the use of any metal periphery.

From the foregoing description, it is believed that the construction and advantages of the device shown herein will be apparent to those skilled in this art. Having thus described my invention, what I claim as new and desire to secure by Letters Patent is:

1. In a changeable display sign, a panel supporting frame comprising vertical members and spaced horizontal members connecting said vertical members, said horizontal members comprising upwardly and downwardly facing panel receiving channels and a downwardly sloping letter receiving channel disposed between said channels, panels removably mounted on said horizontal members, and letter units adapted to engage said letter receiving channels.

2. In a changeable display sign, a panel supporting frame comprising vertical members and spaced horizontal members connecting said vertical members, said horizontal members comprising upwardly and downwardly facing panel receiving channels and a downwardly sloping letter receiving channel disposed between said channels, panels removably mounted on said horizontal members, and letter units adapted to engage said letter receiving channels, said frame and panels being in vertical alignment.

3. In a changeable display sign, a combination including a panel supporting frame, channeled panel frames removably mounted in said panel supporting frame, panels mounted in said channeled frames, the upper panel frame channel of one frame and the lower panel frame channel of the next upper frame being spaced to provide a horizontally extending letter carrying recess between said channels.

4. In a changeable display sign, a combination including a panel supporting frame, said supporting frame comprising vertical bars and vertically spaced horizontal bars connecting said vertical bars, channeled panel frames removably mounted in said panel supporting frame, panels mounted in said channeled frames, the upper panel frame channel of one frame and the lower panel frame channel of the next upper frame being spaced to provide a horizontally extending letter carrying recess between said channels.

5. In a changeable display sign, a combination including a panel supporting frame, horizontal bars in said frame, channeled panel frames removably mounted in said panel supporting frame, said channeled panel frames comprising vertical members and horizontal members having panel mounting channels, said horizontal members having supporting frame engaging channels whereby said panel frames are removably mounted on said horizontal bars in said supporting frame, panels mounted in said channeled frames, said panels being vertically spaced to provide horizontally extending letter carrying recesses between said panels.

6. In a changeable display sign, a combination including a panel supporting frame, horizontal bars in said frame, channeled panel frames removably mounted in said panel supporting frame, said channeled panel frames comprising vertical members and horizontal members having panel mounting channels, said horizontal members having supporting frame engaging channels whereby said panel frames are removably mounted on said horizontal bars in said supporting frame, the upper horizontal members of each panel frame being provided with letter receiving channels, and panels mounted on said panel frames.

7. In a changeable display sign, letter units having a concave portion as the front main body thereof, bevelled flanges on the periphery thereof and mounting means, said means comprising lugs struck out from the surface of said concave portion.

8. In a changeable display sign, letter units having a concave portion as the front main body thereof, bevelled flanges on the periphery thereof and mounting means, said means comprising rearwardly extending lugs provided on the back side of said concave portion.

9. In a changeable display sign, a combination including a panel supporting frame, said frame comprising vertical bars and vertically spaced horizontal bars connecting the vertical bars, and translucent panels removably supported by said horizontal bars and providing a display surface, said translucent panels having integral ribs projecting forwardly and upwardly from the front face thereof for mounting letters thereon.

10. In a changeable display sign, an illuminated sign box having an opening in a side thereof and a display mounting in said opening, said display mounting comprising panel supporting frames mounted side by side on said box at said opening, individual translucent panels movably mounted in said frames for movement into and out of position to close said opening whereby an individual panel may be opened for access to a particular part of the sign box, said panel frames having means cooperating with the panels in closed position to prevent accidental opening of the panels, said display mounting having horizontally running letter mounting recesses in the front thereof, and sign letters having rearwardly and downwardly extending mounting means on the backs thereof for engagement in said recesses.

11. In a changeable display sign, a combination including a panel supporting frame comprising vertical bars and horizontal bars connecting said vertical bars, translucent panels mounted one above another between said vertical bars, means carried by said vertical bars holding the panels in place, said panels having letter unit supporting portions at the top edges thereof, and letter units adapted to engage said supporting portions.

12. In a changeable display sign, a combination including a panel supporting frame comprising vertical bars and horizontal bars connecting said vertical bars, translucent panels mounted one above another between said vertical bars, said horizontal bars having means removably securing said panels in place, said panels having letter unit supporting portions integral therewith, said portions comprising vertically spaced ledges extending substantially the width of said panel, and letter units adapted to engage said supporting portions.

13. In a changeable display sign, a combination including a panel supporting frame comprising vertical bars and horizontal bars connecting said vertical bars, translucent panels mounted one above another between said vertical bars, said horizontal bars having means removably securing said panels in place, said panels having letter unit supporting portions integral therewith, said portions being made of the same translucent material as said panels and comprising a horizontal projection from the face of said panel and extending substantially the width of said panel, and letter units adapted to engage said supporting portions.

14. In a changeable display sign, an illuminated sign box having an opening in a side thereof and a display mounting in said opening, said display mounting comprising panel supporting frames mounted side by side on said box at said opening, said frames comprising spaced vertical bars and vertically spaced horizontal bars connecting said vertical bars, individual translucent panels removably mounted in said frames for movement rearwardly into and forwardly out of position to close openings defined by said vertical bars and said horizontal bars whereby an individual panel may be opened and removed for access to a particular part of the sign box with vertically and horizontally adjacent panels remaining in place, the removable panels and certain of said bars having cooperating means to retain a removable panel in place against accidental opening, said display mounting having horizontally running letter mounting means vertically spaced to conform to the vertical spacing of said horizontal bars, and sign letters having supporting means for engagement with said letter mounting means.

BENJAMIN H. ADLER.